UNITED STATES PATENT OFFICE.

JOHAN ALFRED RYLANDER, OF NORRKÖPING, SWEDEN.

METHOD OF PRESERVING EGGS.

SPECIFICATION forming part of Letters Patent No. 696,495, dated April 1, 1902.

Application filed September 20, 1901. Serial No. 75,750. (No specimens.)

*To all whom it may concern:*

Be it known that I, JOHAN ALFRED RYLANDER, a subject of the King of Sweden and Norway, residing at Norrköping, Norra Stationen, Sweden, have invented a new and useful Improvement in Methods of Preserving Eggs, of which the following is a specification.

The present invention relates to a method of preserving eggs by which they are kept fresh for a long time and when used taste like fresh eggs. The preservation is effected by coating the eggs with a solution of potassium silicate or sodium silicate or a mixture of these silicates, said solution being allowed to dry, leaving on the eggs a firm crust, preventing the microbes of the air from affecting the interior of the eggs. When the preservation is carried out in the hot season, the air inclosed in the egg, being saturated with microbes, has occasionally made the process ineffective. With a view to wholly expelling this air I heat the preserving liquid before coating the eggs therewith to some 60° or 70° centigrade, this having the effect of expelling the air from the eggs coated, so that the liquid dries more quickly and the preservation becomes quite effective. If the eggs have been kept for some time before the preservation is carried out and there is reason to suppose that bacteria have already become developed therein, the heating should be carried up to 80° centigrade. According to experiments made by Pasteur the bacteria are not destroyed until at a temperature of 80° centigrade. Heating to 70° centigrade, consequently, is insufficient, and at too high a temperature, approaching 100°, the egg passes into a boiled or half-boiled state, which is of course not intended with the preservation. By first destroying the bacteria in the egg by heating to 80° centigrade and subsequently coating it with an air-tight crust of the composition above given the deterioration has been made impossible to which the contents of the eggs are subjected when the bacteria are not destroyed, but have time to develop. In the practical tests made it has been found that eggs, even up to twenty or twenty-four days old, if coated, after insufficient heating with the liquid mentioned, have kept even a shorter time than eggs which have not been treated at all with a view to preservation.

From this fact the conclusion has been drawn that the work of deterioration within the egg is even facilitated if the air is entirely shut out. If, on the other hand, the air has been previously heated to 80° centigrade, all life within is extinct, and a coating consisting of an air-tight crust is sufficient to protect it from putrification for a long time. I have based my process of treatment on these experiences won by practical experiments.

The process is carried out as follows: By the aid of a device contrived for the purpose air is heated in an inclosed space to 80° centigrade, said air being kept saturated with salicylic acid dissolved in alcohol. The eggs are placed in this air and allowed to remain for two minutes, whereupon they are taken out and the above-mentioned preserving liquid is poured over them in a cold state on having been previously subjected to a heating to 80° centigrade.

The method in question may be said to be practical also from the point of cheapness, the results of experiments undertaken having shown that the preservation increases the price of one score of eggs by about 2.5 öre (Swedish coin) or less if the process be carried out on a sufficiently large scale.

As a proof of the practical adaptability of the method mention may be made of the fact that a collection of eggs treated according to the method in question was sent around the earth and allowed to pass the equator and returned perfectly fresh and eatable on having thus been exposed to a variety of temperatures.

Having thus described my invention, what I claim is—

A process for preserving eggs, which consists in first heating air saturated with salicylic acid dissolved in alcohol to 80° centigrade, subjecting the eggs to such air, and in applying a solution of potassium silicate previously heated at or about 80° centigrade when in a cooled state.

In witness whereof I have hereunto signed my name, this 27th day of August, 1901, in the presence of two subscribing witnesses.

JOHAN ALFRED RYLANDER.

Witnesses:
ERNST WARDLINDLE,
AXEL WESTERDAKL.